Jan. 21, 1947. H. A. FLOGAUS 2,414,730
SEATING ARRANGEMENT FOR PASSENGER VEHICLES
Filed July 27, 1943
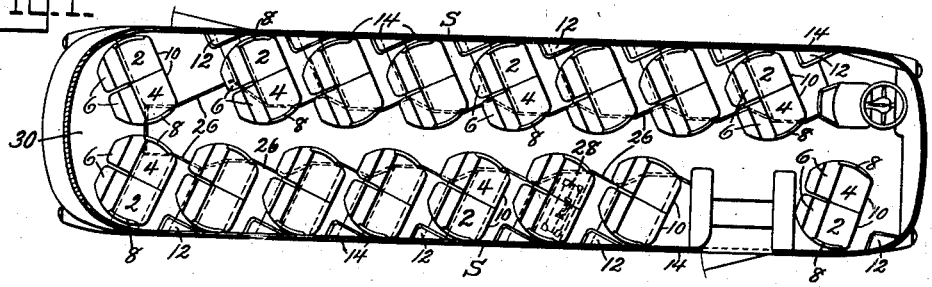
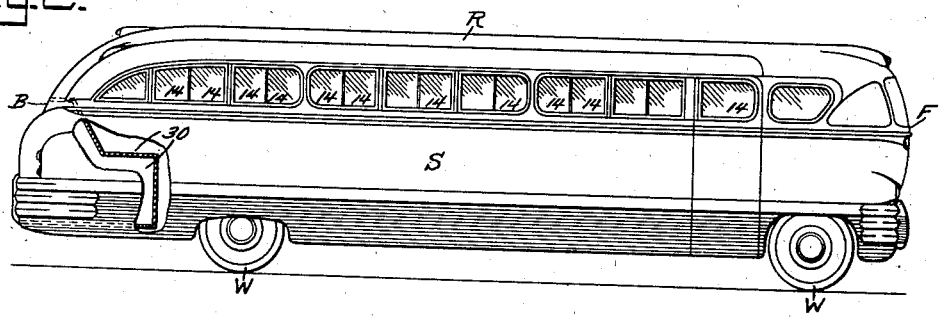
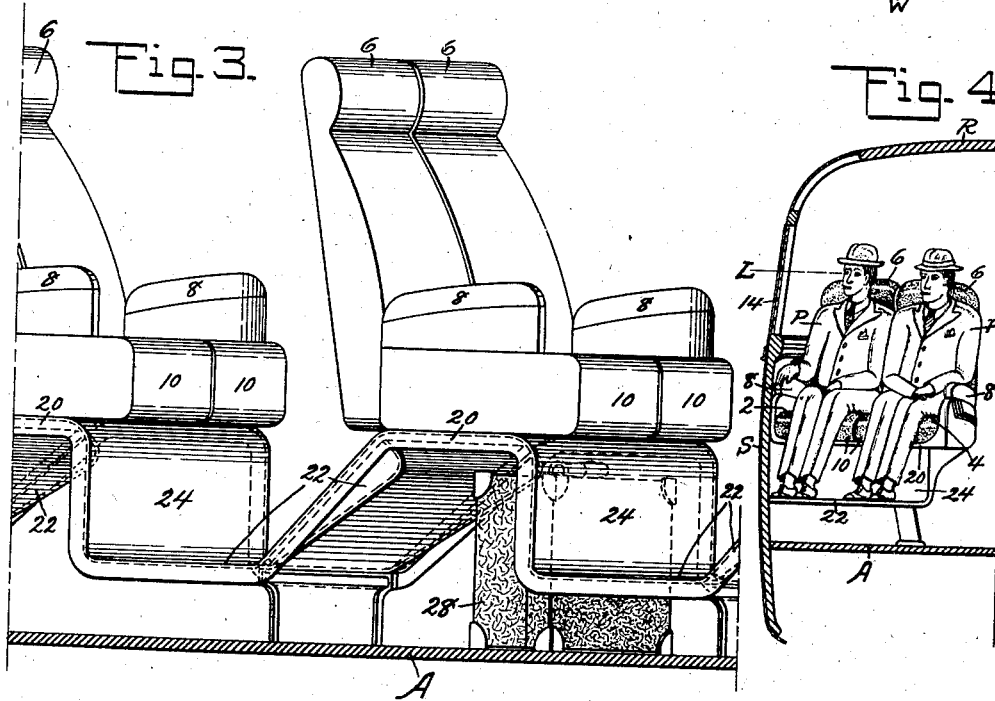
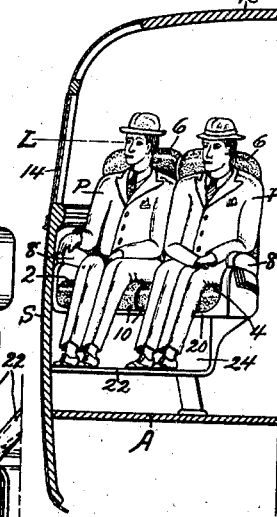
INVENTORS
Howard A. Flogaus
BY Robert A. Shields ATTORNEY Patented Jan. 21, 1947

2,414,730

UNITED STATES PATENT OFFICE 2,414,730

SEATING ARRANGEMENT FOR PASSENGER VEHICLES

Howard A. Flogaus, Wallingford, Pa., assignor to ACF-Brill Motors Company, New York, N. Y., a corporation of Delaware Application July 27, 1943, Serial No. 496,280

3 Claims. (Cl. 296—64)

This invention relates to passenger vehicles in general and in particular to such vehicles adapted to run on highways.

In order to meet certain State requirements it is necessary for highway passenger vehicles operating in interstate commerce to be limited in width. With the width limitation it has been found almost impossible to provide a double seat for a highway vehicle having a width equaling or exceeding thirty-eight inches while maintaining a minimum aisle passage. This, of course, is based on the conventional practice of placing the seats transversely of the vehicle with the passenger's line of vision normal to the front of the vehicle. In a conventional passenger vehicle with the seats normal to the side walls, the passenger adjacent the side wall is frequently very uncomfortable due to the cold in winter and heat in summer, and in case passengers of average or greater than average size are seated together, it is necessary for the wall passenger to crowd the aisle passenger, with the result that the latter must lean toward or crowd out into the aisle space. Furthermore, since the only area of vision for the two passengers in a seat is through a common window, it is sometimes embarrassing and unpleasant for the wall passenger since such passenger is in the line of vision and exhalation of the aisle passenger. It is an object, therefore, of the present invention to provide a passenger vehicle in which the line of vision of adjacent passengers is directed through separate windows, and privacy increased.

A further object of the invention is the provision of a passenger vehicle having seats arranged in a forwardly inclined direction, to the end that both aisle and wall passengers may have greater shoulder space.

A still further object of the invention is the provision of a passenger vehicle having the seats inclined forwardly to the end that greater seat width may be obtained within fixed overall dimensions while maintaining standard aisle widths.

Yet another object of the invention is the provision of a passenger vehicle having the seats arranged at an angle to the side walls with the backs at a substantial distance from the side wall, thereby providing space for substantially triangular parcel shelves arranged between the inner ends of the seats and the side walls.

These and other objects of the invention will be apparent to persons skilled in the art from a study of the following description and accompanying drawing, in which Figure 1 is a substantially horizontal sectional view through the road vehicle disclosing the seating and parcel shelf arrangement;

Fig. 2 is an elevational view of the vehicle with parts broken away to better disclose the end construction;

Fig. 3 is an enlarged view disclosing the specific mounting of the seats upon the vehicle floor; and Fig. 4 is a sectional view through the vehicle and disclosing the position of occupants of the inclined seats.

Referring now to the drawing in detail it will be seen that the vehicle chosen for purposes of illustration is a highway vehicle commonly termed a bus. This vehicle may be of conventional contour having side walls S, roof R, front F, back B and floor A all mounted on wheel and axle assemblies W. As clearly shown in Fig. 1, the seats are formed in pairs to provide a wall seat 2 and aisle seat 4. Each of the seats is provided with a back 6 and an arm rest 8. The seats are inclined forwardly, that is, toward the side walls, thus placing the leading or cushion edge 10 of each seat adjacent the vehicle side wall S. In this manner the backs are thrown out away from the side wall a substantial distance and the space between the arm rest of the wall seat 2 and the wall may be occupied by substantially triangular shaped parcel trays 12. These parcel trays may be located in any horizontal plane desired but it is preferred that they be located beneath the window openings later to be referred to. In some cases it will be found desirable to make these parcel trays solid and place them even with or slightly below the arm rest of the wall seat 2, thus providing additional arm rest space for the wall passenger if he should desire to use the same instead of for parcels, magazines, etc.

The side wall S is provided with any suitable number of window panes 14 framed in any suitable manner to provide windows for ventilation, light and observation purposes. As clearly shown in Figs. 1 and 4, passengers P seated in the inclined seats will have their line of vision L directed through separate panes 14; that is, lines normal to the central part of seat backs 6 will pass forwardly and outwardly through separate panes 14. In this manner the passengers are given a better view of the territory through which the vehicle is passing and the wall passenger need not be subjected to discomforts arising from the aisle passenger watching scenery through the same window pane that the wall passenger uses.

The inclined seats may be supported in any suitable manner on the vehicle floor, such as by the customary pedestal arrangement. It will be advantageous, however, to mount the seats on a platform and in accordance with the teaching of Mathauer 2,261,693. Accordingly, the seats have been shown as mounted on a platform elevated above the floor and having a seat supporting portion 20, a foot rest portion 22 and a riser portion 24. The aisle edges 26 of this raised and sawtooth form platform are of irregular form, thus permitting greater aisle space for the insertion and removal of luggage 28. In addition to the luggage space provided beneath the raised platform it will be seen that inclination of the seats provides a greater rear luggage space 30, since the rear seats do not extend straight across the vehicle but at an acute angle to the side walls.

It will be seen from the preceding description that inclination and staggering of the seats transversely of the vehicle permits of increased seat width within overall limitations, while at the same time permitting the occupants a clear vision forwardly and at a slight angle to the direction of travel and through independent window panes. It will further be seen that the inclination of the seats forwardly at an acute angle to the side walls will throw the passenger's shoulders and trunk away from the side walls, thus giving the wall passenger more shoulder space and removing his body away from the cold or hot side wall, dependent upon the season of the year. The inclination of the seats at an acute angle to the side walls also permits the installation of small parcel trays and permits the wall passenger to make full use of the arm rest since it is not jammed tight against the side wall as in conventional vehicles. All of these tend to give the passenger much greater riding comfort, freedom and in a sense greater privacy.

While the construction has been described more or less in detail with specific reference to the figures, it will be apparent that slight modifications in construction and arrangement of parts may be made and all such modifications and changes are contemplated as will fall within the scope of the appended claims defining my invention.

What is claimed is:

1. A passenger vehicle having side walls and a floor, saw-tooth form platforms supported on the floor in spaced relation thereto and each located adjacent a side wall to provide an aisle space therebetween, the peak portions of said platforms being flattened and arranged in staggered relation transversely of the vehicle and at an acute angle to the side walls whereby luggage may be more readily inserted beneath said peak portions, and seats arranged on said peak portions in staggered relationship transversely of the vehicle and at an acute angle to the side walls.

2. A passenger vehicle having side walls and a floor, saw-tooth form platforms supported on the floor in spaced relation thereto and each located adjacent a side wall to provide an aisle space therebetween, said platforms having flattened seat supporting peak portions arranged in staggered relation transversely of the vehicle and at an acute angle to the side walls whereby luggage may be more readily inserted beneath said peak portions, said arrangement being such as to result in the provision of increased luggage space in the rear of said vehicle formed in part by the rearmost of said seat supporting platforms.

3. A passenger vehicle having a floor, and side walls having a plurality of window panes therein, saw-tooth form platforms supported on the floor in spaced relation thereto and each located adjacent a side wall to provide an aisle space therebetween, the peak portions of said saw-tooth platforms being flattened and arranged in staggered relation transversely of the vehicle and at an acute angle to the side walls whereby luggage may be more readily inserted beneath said peak portions, and double seats arranged on said peak portions in staggered relationship transversely of the vehicle and at an acute angle to the side walls, said angle being so chosen that the lines normal to the central portion of each seat back will be substantially parallel and extend forwardly through independent window panes on the adjacent side of the vehicle.

HOWARD A. FLOGAUS.